United States Patent [19]
Weekamp et al.

[11] Patent Number: 4,881,151
[45] Date of Patent: Nov. 14, 1989

[54] ELECTROLYTIC FOIL CAPACITOR

[75] Inventors: Johannus W. Weekamp; Benedictus C. H. Fransen; Hendrik van der Ploeg, all of Eindhoven, Netherlands

[73] Assignee: U.S. Philips Corporation, New York, N.Y.

[21] Appl. No.: 311,560

[22] Filed: Feb. 15, 1989

[30] Foreign Application Priority Data

Mar. 7, 1988 [NL] Netherlands ............... 8800558

[51] Int. Cl.$^4$ .................................... H01G 9/00
[52] U.S. Cl. ............................................. 361/531
[58] Field of Search ............... 361/511, 520, 530, 531

[56] References Cited
U.S. PATENT DOCUMENTS 3,015,759 1/1962 Bügel et al. .................... 361/531
3,938,228 2/1976 Kemkers et al. ............... 361/520 X Primary Examiner—Donald A. Griffin
Attorney, Agent, or Firm—Norman N. Spain

[57] ABSTRACT

An electrolytic foil capacitor comprises a metal housing sealed on one side with an electrically insulating material, the housing containing, wound around a metal pin, an assembly of an anode foil at least two separator foils, and a cathode foil, which are wound together to form a roll. The cathode foil is provided with a first tag projecting from roll, which tag is mechanically and electrically connected to the metal housing of the capacitor. The capacitor roll is mechanically connected to the metal pin via a short side of a strip of a separator foil 24, and because the anode foil is provided with a second tag projecting from the roll, which tag is mechanically and electrically connected to the metal pin.

3 Claims, 1 Drawing Sheet

ELECTROLYTIC FOIL CAPACITOR

BACKGROUND OF THE INVENTION

The invention relates to an electrolytic foil capacitor comprising a metal housing which is open on one side and which is provided on this side with a seal formed of an electrically insulating material. The housing contain, wound around a metal pin, an assembly of a strip of an anode foil provided with a dielectric oxide layer by forming, two or more strips of separator foils impregnated with electrolyte liquid, and a strip of a cathode foil, which are wound together to form a roll. The metal pin is led outwards through the seal on the open side of the housing, and the cathode foil is provided with a first tag protruding from the roll, which is tag being mechanically and electrically connected to the housing.

In United States patent specifications U.S. 3,754,113 such a capacitor is disclosed, in which the anode foil is mechanically and electrically connected to the metal pin via the short side of the strip and the metal pin is provided with an axial lead wire, the cathode foil being provided with a tag projecting from the roll, which tag is mechanically and electrically connected to the housing on the bottom side of the housing, and the latter is provided with a second lead wire.

High-capacitance anode foils for the manufacture of electrolytic foil capacitors having a large product of operationing voltage and capacitance have a surface which is substantially enlarged by pores. Such a foil is brittle and cannot be reliably connected to the metal pin by means of the customary techniques such as cold welding or ultrasonic welding. Cementing using an adhesive also leads to problems in the realisation of an electrically conductive connection.

Another problem which may occur in the known electrolytic capacitors is caused by the fact that the first part of the anode foil is not surrounded by the cathode foil. This leads in certain frequency ranges to a decrease of the capacitance and an increase of the electric losses.

Since the connections of the anode foil and the cathode foil are asymmetrical, the capacitor has a relatively large self-induction (ESL). This is undesired with respect to application at high frequencies.

An additional problem is the relatively high equivalent series resistance which is caused by the fact that a long strip of anode foil is electrically connected to the anode pin at one end only.

SUMMARY OF THE INVENTION

It is an object of the invention to provide an electrolytic foil capacitor in which also high-capacitance anode foil can reliably be connected electrically to the anode pin, and which has improved electrical properties, in particular as regards the dependence of capacitance and loss factor on the frequency used. A further object of the invention is to obtain a decrease of the self-induction and the equivalent series resistance. It is an object of the invention to use the proven pin construction in the manufacture of the electrolytic foil capacitor because it facilitates the manufacture and transport of the roll, for example during impregnating the separator foils and accommodating them in a housing, as described in, for example, the above-mentioned U.S. Pat. No. 3,754,113.

This object is achieved according to the invention by an electrolytic foil capacitor as described in the opening paragraph, which capacitor is further characterized in that the roll is mechanically connected to the metal pin via a short side of a strip of a separator foil, and in that the anode foil is provided with a second tag projecting from the roll, which tag is mechanically and electrically connected to the metal pin.

On the inside of the roll, the strip of cathode foil, preferably, is so much longer than the strip of anode foil that the cathode foil makes at least one full turn around the metal pin before the beginning of the anode foil. It is noted, that neither the anode foil nor the cathode foil mechanically contact the metal pin which is connected only to a strip of a separator foil.

Very suitable electrical properties, for example a low self-induction and a low equivalent series resistance, are obtained if the first and the second tag are placed near the center of the strips of the cathode foil and the anode foil, respectively, measured in the longitudinal direction of the strips.

DETAILED DESCRIPTION OF THE INVENTION

Figure 1A:
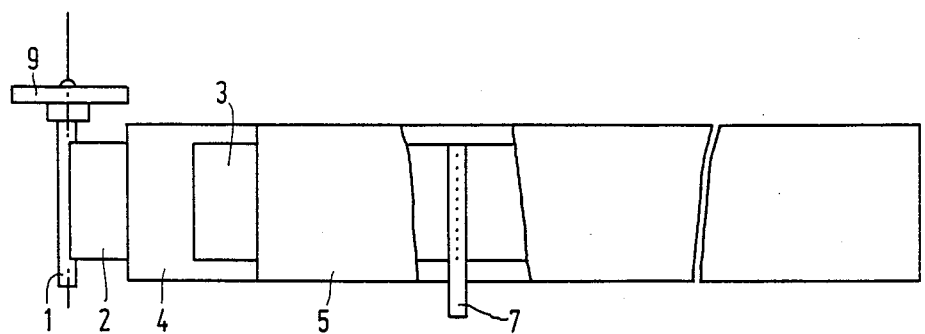
FIG. 1a and FIG. 1b are respectively illustrations of a roll for an electrolytic capacitor and a cross-sectional view of a capacitor according to the present state of the art.

For a more complete understanding the invention will now be described in greater detail.

The invention will be explained in more detail by means of a comparative example and an exemplary embodiment, and with reference to the drawing.

Comparative example, not according to the invention

FIG. 1a shows the construction of a roll for an electrolytic capacitor according to the present state of the art, in which 1 is a metal pin to which a strip of an anode foil 2 is connected mechanically and electrically. The roll further comprises a strip of a separator foil 4, for example made of paper, a strip of a cathode foil 3 and a strip of a separator foil 5. The cathode foil 3 is provided with a cathode tag 7, for example manufactured from an aluminum strip.

Figure 1B:
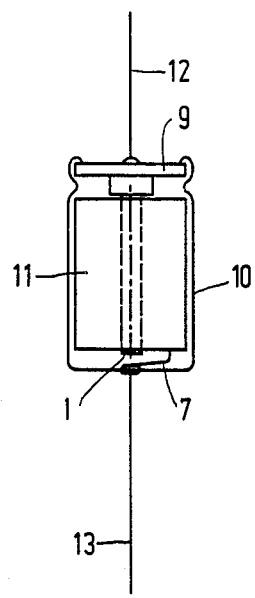

FIG. 1b shows a wound roll 11 which is accommodated in a metal housing 10. The metal housing is sealed by means of a disc 9 of electrically insulating material, through which the anode pin 1 is led outward. The cathode tag 7 is internally connected to the housing 10, for example in the way indicated in U.S. Pat. No. 3754113. The pin 1 is connected to an axia lead wire 12, the metal housing 10 is connected to an axial lead wire 13.

Exemplary embodiment, according to the invention

Figure 2B:
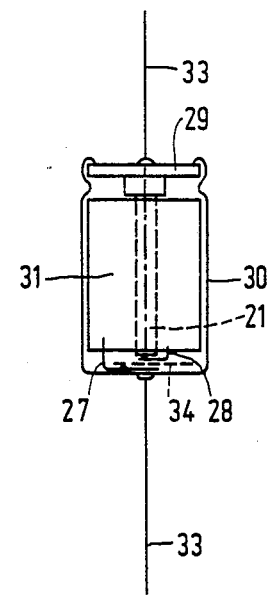
FIGS. 2a and 2b are respectively an illustration of a roll for an electrolytic capacitor and a cross-sectional view of a capacitor according to the invention.
Figure 2A:
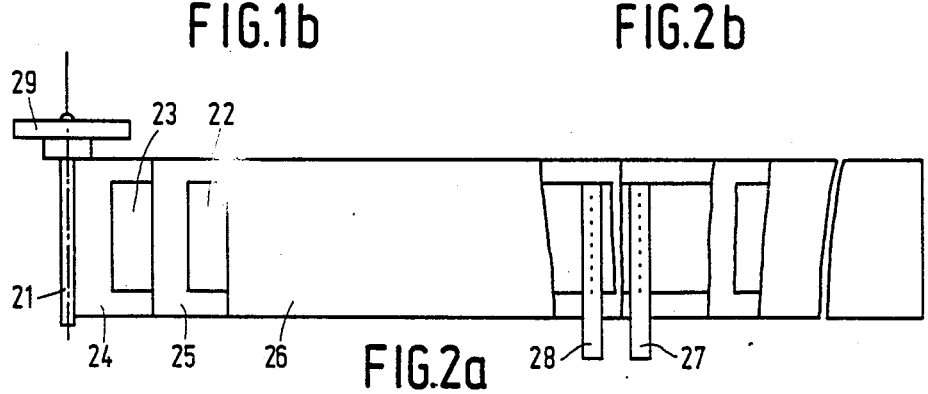

FIG. 2a shows the construction of a roll for an electrolytic capacitor according to the invention, in which 21 is a metal pin to which a strip of a separator foil 24 is connected mechanically. The separator foil 24, for example a paper strip, can be reliably connected by means of clamping or an adhesive. The roll further comprises, in succession, a strip of the cathode foil 23 and a strip of a separator foil 25. After the cathode strip 23 has made one full turn it is followed by a strip of an anode foil 22, and if desired, by a further strip of a separator foil 26.

The anode foil consists of a strip of a valve metal, for example aluminum, which is provided with a dielectric oxide layer by forming. Preferably, the cathode foil also consists of aluminium. The anode foil 22 is provided with an anode tag 28, the cathode foil 23 is provided with a cathode tag 27. Each of the tags is manufactured from, for example, an aluminum strip and is preferably placed near the center of the strips of the respective foils. The tags are secured, for example, by means of cold welding or stapling.

FIG. 2b shows a wound roll 31 which is accommodated in a metal housing 30. The separator foils are impregnated with an electrolyte liquid in a known manner. The metal housing is sealed by means of a disc 29 of an electrically insulating material, through which the anode pin 31 is lead outwards. The anode tag 28 is electrically connected to the anode pin 31, for example by welding. The cathode tag 27 can be internally connected to the housing 30, for example, by means of laser welding; the laser energy can be supplied from outside the housing. Between the connection of the anode tag to the anode pin and the cathode tag to the housing there is, preferably, a plate 34 of electrically insulating material, for example a foil of polyvinyl chloride. This plate may also be used as a pressure plate, in particular during laser welding. The metal pin 31 is connected to an axial lead wire 32, the metal housing 30 is connected to an axial lead wire 33.

What is claimed is:

1. An electrolytic foil capacitor comprising a metal housing which is open on one side and which is provided on said side with a seal of electrically insulating material, said housing containing, wound around a formed metal pin, an assembly of a strip of an anode foil provided with a dielectric oxide layer, two or more strips of separator foils impregnated with an electrolyte liquid, and a strip of a cathode foil, which are wound together to form a roll, the metal pin being lead outwards through the seal on the open side of the housing, and the cathode foil being provided with a first tag protruding from the roll, said tag being mechanically and electrically connected to the housing, characterized in that the roll is mechanically connected to the metal pin via a short side of a strip of a separator foil, and that the anode foil is provided with a second tag projecting from the roll, which tag is mechanically and electrically connected to the metal pin.

2. An electrolytic foil capacitor as claimed in claim 1, characterized, on the insid of the roll in that the strip of cathode foil is so much longer than the strip of anode foil that the cathode foil makes at least one full turn around the metal pin before the beginning of the anode foil.

3. An electrolytic foil capacitor as claimed in claim 1, characterized in that the first and second tag are placed near the centre of the strips of the cathode foil and the anode foil, respectively, measured in the longitudinal direction of the strips.

* * * * *